Jan. 28, 1930.  U. S. BOYLE  1,745,243
COOKING VESSEL
Filed April 20, 1928
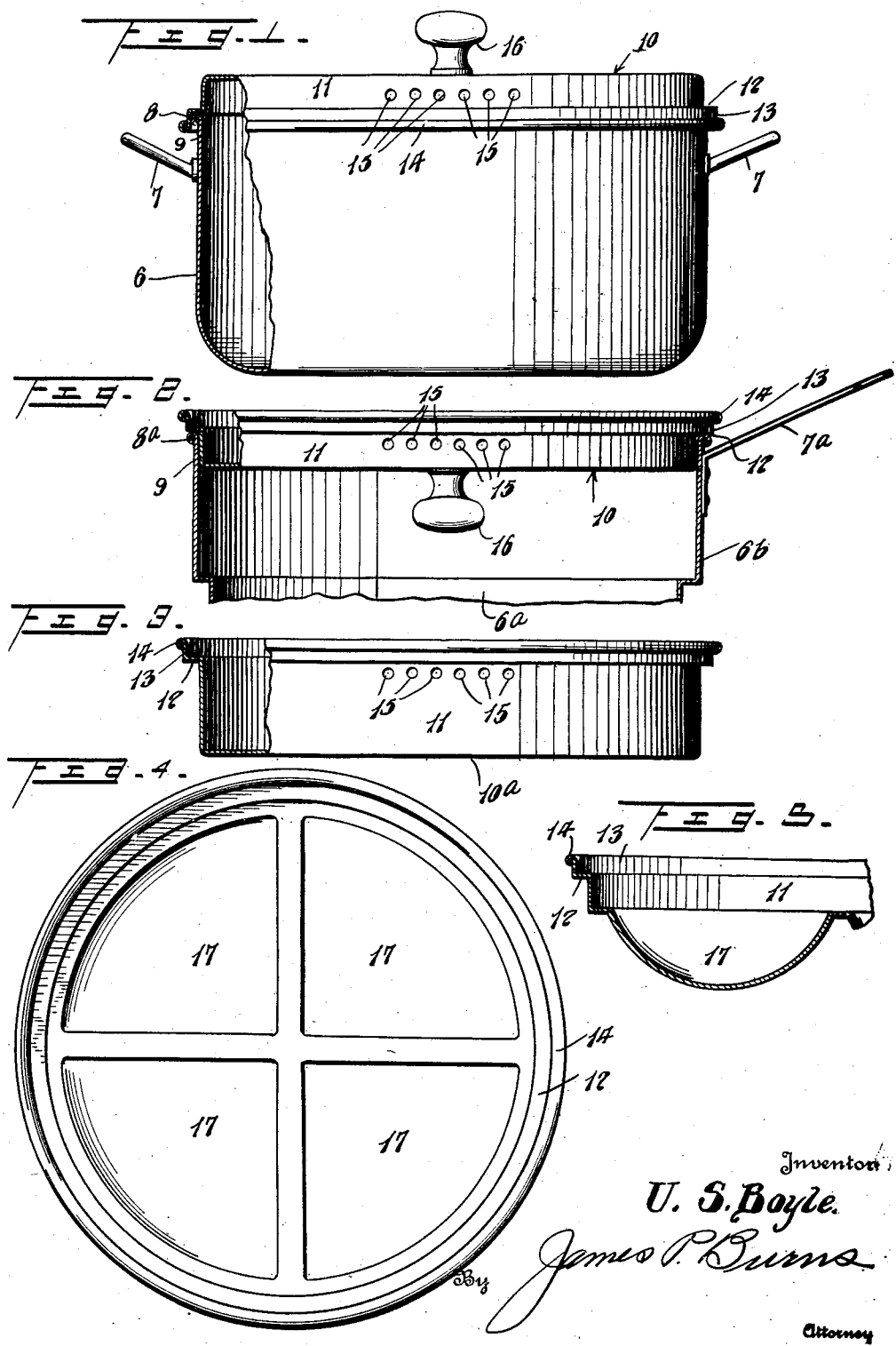
Inventor
U. S. Boyle.
By James P. Burns
Attorney Patented Jan. 28, 1930

1,745,243

UNITED STATES PATENT OFFICE

URBAN S. BOYLE, OF ERIE, PENNSYLVANIA

COOKING VESSEL

Application filed April 20, 1928. Serial No. 271,600.

This invention relates to improvements in cooking vessels and deals more particularly with cover structures and the manner in which they cooperate with the body portions of the vessels to adapt the latter for many different uses.

The primary object of the invention is to provide a cooking vessel, preferably of the kettle type, having a novel cover structure which will permit of the vessel being employed for boiling foods and draining the liquor therefrom without removing the cover.

Another object of the invention is to provide a vessel of the above mentioned type which may be rendered air-tight to adapt it for use as a container for foods.

A still further object of the invention is to provide a novel cover structure which may be employed independently of or in connection with the body portion of the vessel for cooking and preparing foods.

A further important object of the invention is the constructing of a cover so that it may be supported reversibly on the upper edge of the body portion of a vessel.

Other objects and advantages of the invention will be apparent during the course of the following description:

In the accompanying drawing forming a part of this specification and in which like numerals are employed to designate like parts throughout the same, Figure 1 is a side elevational view, partly broken away, of a cooking vessel embodying this invention, Figure 2 is a fragmentary vertical sectional view of a slightly modified form of cooking vessel, Figure 3 is a similar view to Figure 1 but shows a modified from of cover structure, Figure 4 is a top plan view of a further modified form of cover structure, and Figure 5 is a fragmentary sectional view of the cover structure shown in Figure 4.

In the drawing, wherein for the purpose of illustration is shown a preferred embodiment of this invention, the numeral 6, in Figure 1, designates the body portion of a cooking vessel which is of the kettle type. This particular body portion is provided with looped handles 7 which are arranged on opposite sides thereof. The upper edge of the body portion is rolled outwardly to form a bead 8.

In Figure 2 a slightly modified form of body portion is illustrated. This form includes the main portion 6$^a$ and the upper open end portion 6$^b$ which is of greater diameter than the portion 6$^a$. A single handle 7$^a$ is provided for this form of container and is in the form of an elongated strip of material suitably secured to the body portion. The upper edge of the enlarged part 6$^b$ is rolled into the bead 8$^a$.

It is intended, by illustrating these two different forms of vessel bodies, to show that the same may take any desired form and may be provided with any suitable kind of handle. The only requisite is that the open end portion 9 of the body be of the same circumferential shape as the offset portion of a cover which now will be described.

In Figures 1 and 2 a cover 10 is illustrated as having the concentric offset portion 11 and at its edge the radially extending flange 12. Outwardly of the flange, the cover takes the form of a concentric skirt portion 13 having a bead 14 formed on its edge. The peripheral portion of the offset 11 is formed with one or more apertures 15. It is to be understood that these apertures may be of any desired shape and may be formed in any suitable manner. It is important, however, that they occur in the periphery of the offset portion 11.

In Figure 1 the cover is illustrated as being arranged upon the body portion 6 with the offset portion 11 projecting upwardly and outwardly therefrom. The flange 12 necessarily forms an abutment or shoulder at each face of the same and this shoulder engages the bead 8 on the body portion 6 to properly support the cover upon the latter. The skirt 13 and bead 14 of the cover surround the bead 8 of the body portion and maintain the cover centered upon the latter. A suitable handle 16 is provided for the cover to permit easy manipulation of the latter. With the cover arranged as shown in Figure 1, it will be apparent that the vessel may be employed for boiling foods. After the contents of the vessel have been properly cooked, the liquor may be drained from the vessel through the apertures 15 without removing the cover.

In Figure 2 the cover has been reversed and the offset portion 11 has been inserted in the open end portion 9 of the vessel body. The offset portion 11 should be of a proper diameter and shape to tightly fit the edge portion 9. In view of this fact, the edge portion and the offset portion may be either cylindrical, conical, or polygonal just so both of these portions are similar. It will be noted that the apertures 15 in Figure 2 are located below the upper edge of the part 9 and therefore will be sealed by this latter part. With the cover arranged with the offset portion inserted in the body of the vessel, an air-tight container or vessel is provided. The flange 12 functions in a similar manner when the cover is arranged in either of the positions illustrated in Figures 1 and 2; namely, as a shoulder or rest for supporting the cover upon the beaded edge of the body of the vessel.

In Figure 3 the cover 10ª has been drawn deeper so that it may be used either independently or in connection with a vessel body for cooking or preparing foods. This cover 10ª, for instance, may be used for baking purposes. The cover 10ª also is formed with apertures 15, the radial flange 12, the concentric skirt 13 and bead 14. This cover, therefore, may be reversed in the same manner as illustrated in Figures 1 and 2 for permitting a vessel to be employed for boiling foods or as an air-tight vessel or container.

In Figures 4 and 5, the cover has been shaped to form the egg poaching pockets 17. The remaining portions of this cover are the same as those illustrated in Figs. 1 to 3, inclusive. These similar portions will be referred to by the same reference characters as employed in the former figures.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A vessel of the type described, comprising a body portion and a cover for said body portion, said cover being formed with an offset portion shaped to tightly fit the open end of the body portion when inserted therein and having one or more apertures formed in its periphery, said apertures being sealed when the offset is inserted in the body portion and being unobstructed when the cover is reversed with respect to the body portion.

2. A vessel of the type described, comprising a body portion and a cover for said body portion, said cover being formed with a radially extending flange reversely engageable with the upper edge of the body portion and an offset portion shaped to tightly fit the open end of the body portion when inserted therein and having one or more apertures formed in its periphery, said apertures being sealed when the offset portion is inserted in the body portion and being unobstructed when the cover is reversed with respect to the body portion.

3. A vessel of the type described, comprising a body portion having a cylindrical open end and a cover for said body portion, said cover being formed with a cylindrical offset closed at one end and of a size to tightly fit the open end of the body portion when inserted therein with its closed end down and having one or more apertures formed in its periphery, said apertures being sealed when the offset is inserted in the body portion and being arranged above the body portion when the cover is reversed with respect to the body portion, and a concentric flange on the cover at the open end of the offset and supporting the cover on the body portion in either of its operative positions.

4. A vessel of the type described, comprising an open ended body portion, and a cover for said body portion, said cover having a radial flange shaped to reversibly rest upon a beaded edge of the body portion, an angularly arranged skirt formed on the flange so as to surround the said edge of the body portion when the cover is in one position to prevent lateral displacement of the cover, and a cylindrical offset portion projecting from the flange in the opposite direction to that of the skirt and adapted to tightly fit the wall of the open end of the body portion when the cover is in its other position, said offset portion being closed at its outer end and having drain apertures which are sealed when the offset portion tightly fits the body portion and are uncovered when the skirt engages the body portion.

In testimony whereof, I affix my signature.

URBAN S. BOYLE.